United States Patent Office 3,532,384
Patented Oct. 6, 1970

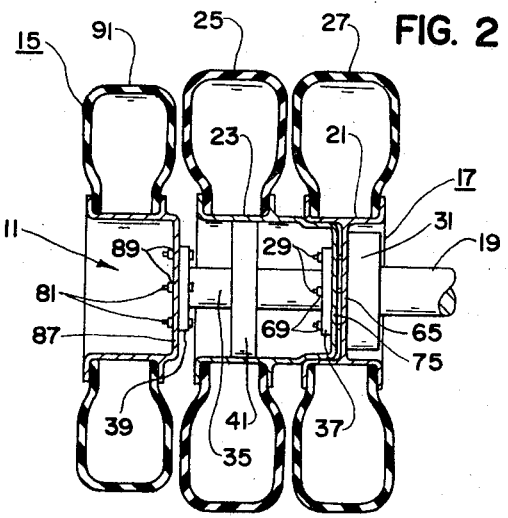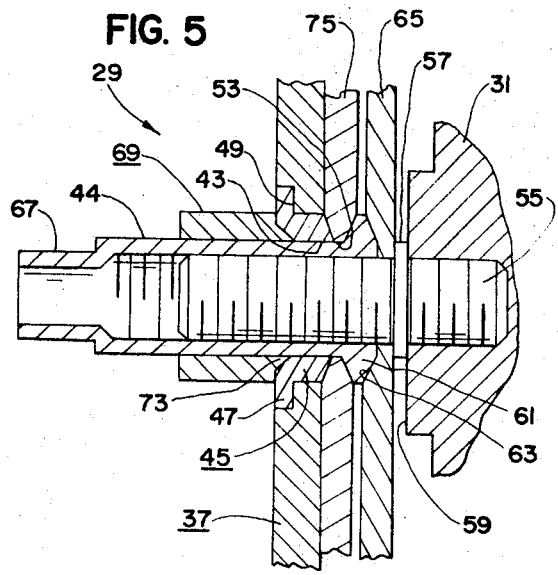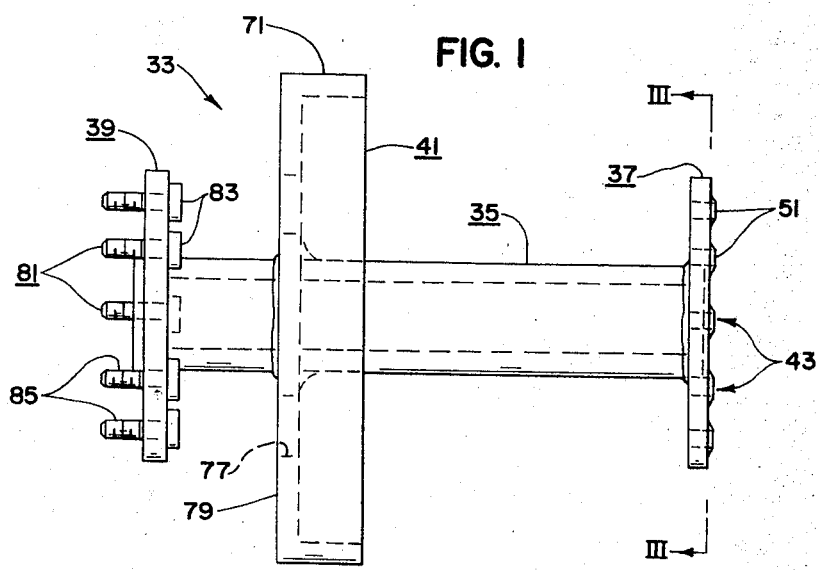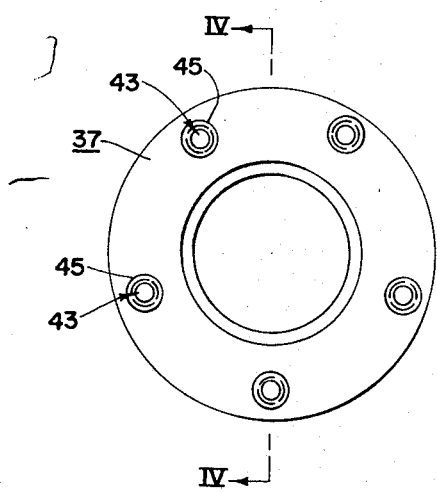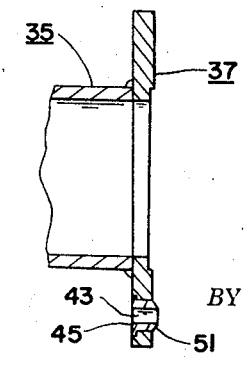
INVENTOR.
ROBERT E. WILLIAMS, JR.

3,532,384
AUXILIARY ROAD WHEEL MOUNTING ADAPTOR MEANS
Robert E. Williams, Jr., 203 Lombardy Road, Memphis, Tenn. 38111
Filed Feb. 13, 1969, Ser. No. 798,942
Int. Cl. B60b 11/00
U.S. Cl. 301—36                        5 Claims

ABSTRACT OF THE DISCLOSURE

Adaptor means for coaxially mounting an auxiliary road wheel laterally of an existing vehicle road wheel, the adaptor device includes oppositely arranged inboard and outboard annular flange structure adapted to be threadedly attached by fastener means between the existing road wheel on a road vehicle and an auxiliary road wheel. The adaptor device also includes support ring structure adapted to snugly fit within the interior of the rim structure of the existing vehicle mounted road wheel for reinforcing the attachment of the auxiliary wheel on the existing vehicle wheel.

BACKGROUND OF THE INVENTION

Field of the invention

The invention relates to auxiliary wheel means for increasing traction of a vehicle as it moves through soft terrain such as snow, sand, mud or the like. The invention particularly relates to an adaptor device for adapting a conventional road wheel to a road wheel mounted on a vehicle.

Description of the prior art

Heretofore, a typical practice in increasing the traction or road bearing surfaces of a wheel type road vehicle has been to utilize additional axles mounted forwardly or rearwardly of a particular load bearing axle of the vehicle. Typically, an additional load bearing wheel is arranged generally in longitudinal alignment with the original or existing wheels of the vehicle and may be arranged forwardly or rearwardly of the existing wheel means of the vehicle. Such longitudinally spaced apart wheel means of prior art function rather well when the vehicle is being moved along a substantially straight course; however, when the vehicle is being cornered or turned along a curved course, the longitudinally spaced apart road engaging surfaces respectively of the existing wheel and the auxiliary wheel causes a scrubbing action between the respective load bearing tire surfaces and the road surface as the vehicle is being turned along a curved course. Such scrubbing action on the rubber tires of the vehicle rapidly wears the tires and necessitates frequent replacement of the tires. Also, longitudinally spacing an auxiliary wheel from an original or existing wheel in tandem fashion may not be feasible because of existing structure interfering with such wheel mounting means. The typical road wheel housing structure of a vehicle is closely arranged about the respective road wheel and will not generally permit a tandem mounting of an auxiliary road wheel without substantial modification to the existing vehicle body, fender structure, or other such vehicle structure.

SUMMARY OF THE INVENTION

The present invention obviates the above mentioned difficulties in mounting an auxiliary wheel on a vehicle by mounting the auxiliary wheel in coaxial alignment with the existing road wheel and at a disposition closely spaced laterally of the existing road wheel. The present invention utilizes a substantially simple adaptor device, which includes a support ring, adapted for rigidly securing the auxiliary wheel in closely spaced arrangement laterally of the existing road wheel. The adaptor device of the present invention may readily be used with a road vehicle having single or dual arranged wheels and is particularly useful for mounting an auxiliary wheel on the rear wheels of a road tractor, motor transport type truck, or for mounting an auxiliary wheel on the dual arranged wheels of a semi-trailer or full trailer.

The coaxial mounting of the auxiliary wheel means of the present invention substantially obviates the scrubbing action of the wheel tires as a vehicle is cornered or moved along a curved course. Moreover, the coaxial mounting of the auxiliary wheel permits the wheel to readily be mounted on an existing vehicle wheel without modification of existing vehicles body or fender structure. Also, the auxiliary wheel means of the invention may be formed to a diameter smaller than the diameter of the existing road wheel and thus permit the auxiliary wheel to engage the ground or supporting surface only at such times as when the vehicle is traversing soft or muddy terrain. An auxiliary wheel smaller in diameter than the diameter of its supporting road wheel permits the auxiliary wheel to run clear of the ground or supporting surface when the vehicle is running on a hard surfaced road, while yet permitting the auxiliary wheel to carry part of the vehicle load and increase traction of the vehicle when the vehicle is traversing a soft road surface or terrain. Also, the auxiliary wheels give a greater width and therefore a greater stability to the vehicles. The adaptor device of the present invention utilizes existing wheel fastening means in fastening the auxiliary wheel on the existing wheel structure of a vehicle and may readily be installed or removed from the existing wheel structure of a vehicle. The substantially simple and durable structure of the adaptor device of the invention provides adaptor means which is strong and durable and an adaptor device which may readily be economically fabricated and marketed.

BRIEF DESCRIPTION OF THE DRAWING

FIG. 1 is a side elevational view of the adaptor device of the present invention.

FIG. 2 is a sectional environmental view showing the adaptor device in use in mounting an auxiliary wheel on an existing dual wheel of a vehicle.

FIG. 3 is an end view of the adaptor device taken as on the line III—III of FIG. 1.

FIG. 4 is a vertical plane sectional view taken as on the line IV—IV of FIG. 3.

FIG. 5 is an enlarged longitudinal sectional view of one of the threaded fastener means of the invention.

DESCRIPTION OF THE PREFERRED EMBODIMENT

The adaptor means of the present invention is indicated by numeral 11 and will be described in conjunction with an auxiliary road wheel 15 and a duel tire vehicle wheel 17 supported on a vehicle axle 19. Dual tire wheel 17 includes inboard and outboard steel rim structures 21, 23 concentrically fitted respectively with road engaging tire structures 25, 27. A plurality of threaded fasteners 29 concentrically arranged about the axis of rotation of dual tire wheel means 17 fixedly secure the wheel on the rotating hub 31 of the vehicle (see FIGS. 2 and 5).

Auxiliary wheel adaptor means 11 basically includes an adaptor device 33 adapted to coactingly engage existing vehicle wheel and wheel fastening nut means of the vehicle. Adaptor device 33 basically includes a substantially short tubular frame 35; inboard and outboard external flange structure 37, 39 arranged respectively on opposite end portions of frame 35; and support ring structure 41 concentrically fixed on the intermediate portion of tubular frame 35. Inboard flange structure 37 of adaptor device 33 includes structure defining a plurality of circumferentially equiangularly arranged openings 43 adapted to receive respectively the plurality of sleevelike inner nuts 44 of threaded fasteners 29 (see FIG. 5). Inboard flange openings 43 preferably are defined respectively by a plurality of bushings 45 having shoulder portions 47 received respectively in countersunk recesses 49 formed in inboard flange structure 37. Bushings 45 each include annular conelike projections 51 adapted to matingly engage respectively with chamfered openings 53 of dual tire wheel 17.

Sleevelike inner nuts 44 of threaded fasteners 29 each are threadedly received on wheel studs 55 threadedly fitted respectively in wheel hub 31. Wheel studs 55 each are provided with a shoulder portion 57 abuttingly engaging the outside surface 59 of hub 31. Sleevelike inner nuts 44 each are provided with an annular portion 61 adapted for abuttingly engaging chamfered openings 63 formed in wheel mounting section 65 of dual tire wheel 17. Sleevelike inner nuts 44 each are provided with a wrench-engaging portion 67 adapted to receive a socket wrench in tightening nuts 44 and in clampingly fixing annular portions 61 of nuts 44 against wheel mounting section 65 of dual tire wheel 17.

Adaptor device 33 is adapted to be fitted substantially within the interior of steel rim 23 of dual tire wheel 17 and fixedly secured concentrically in wheel 17 by means of a plurality of internally threaded outer nuts 69 threadedly secured on sleevelike inner nuts 44. Adaptor device 33 is adapted to be fitted in dual tire wheel 17 with the outer circumferential surface structure 71 of support ring 41 snugly engaging rim structure 23 of wheel 17. Outer nuts 69 are adapted to clampingly engage inboard flange bushings 45 with annular conelike projections 73 respectively of nuts 69 clampingly engaging inboard flange 37 and clampingly securing flange 37 against wheel mounting section 75 of dual tire wheel 17. A plurality of apertures 77 formed respectively in radially projecting portion 79 of support ring structure 41 provides aperture means for receiving wrench extension means for tightening threaded fasteners 29 and securing adapter device 33 to the existing road wheel means of the vehicle.

A plurality of threaded studs 81 are frictionally fixed in concentric arrangement in outboard flange 39 with head portions 83 arranged inwardly and threaded shank portions 85 projecting outwardly. Threaded studs 81 are adapted to be received respectively in concentrically arranged apertures in wheel mounting section 87 of auxiliary wheel 15. A plurality of internally threaded nuts 89 are threadedly engaged respectively on shank portions 85 of studs 81 and clampingly secure mounting section 87 of auxiliary wheel 15 on outboard flange 39 of adaptor device 33.

The outside diameter of auxiliary wheel tire 91 preferably is smaller than the diameter of tires 25, 27 of dual tire wheel 17. The outside diameter of auxiliary wheel tire 91 preferably is smaller than the outside diameter of tires 25, 27 for permitting the auxiliary wheel tire to ride clear of the road or ground surface except when such supporting surface is spongy or soft and does not have sufficient stability for proper traction of the vehicle. Also, by providing an auxiliary wheel tire of a diameter only slightly smaller than the diameter of the dual tire wheel, the auxiliary wheel may be functional when utilized in a heavily loaded vehicle traveling along a hard surfaced road and when the load on the vehicle is such that the tires are flattened and auxiliary wheel 15 engages the road surface. Auxiliary wheel 15 thus may function for providing additional traction of a vehicle when traveling over soft or marshy terrain and also may function as auxiliary load supporting wheel means when traveling along a hard surfaced road.

I claim:

1. Adaptor means for mounting an auxiliary road wheel concentrically on the wheel mounting structure of an existing vehicle mounted road wheel having rim structure defining and interior surface and with the vehicle having a plurality of wheel hub inner nuts supporting said existing vehicle mounted wheel on the wheel hub of the vehicle, and further, with the auxiliary wheel having a plurality of wheel mounting openings concentrically arranged about the axis of rotation of the auxiliary road wheel, the adaptor means including annular inboard flange structure having structure defining a plurality of circumferentially arranged openings adapted to receive respectively the plurality of circumferentially arranged vehicle hub inner nuts, and with said annular inboard flange structure being adapted to be rigidly clamped against the wheel mounting structure of the existing road wheel, annular outboard flange structure, fastener means adapted for clamping said outboard flange structure concentrically on said auxiliary wheel, support ring means having a circumferential peripheral surface of a diameter substantially greater than the diameter of said annular inboard flange adapted to snugly engage the interior surface of the rim structure of the existing road vehicle wheel, and frame structure rigidly interconnecting said inboard flange srtucture, said outboard flange structure and said supporting ring structure, and with said inboard flange structure, said outboard flange structure and said support ring being spaced apart and in coaxial alignment.

2. The adaptor means of claim 1 in which said fastener means includes a plurality of threaded studs passing through said plurality of wheel mounting openings of said auxiliary wheel.

3. Adaptor means for mounting an auxiliary road wheel coaxially on the wheel mounting srtucture of an existing vehicle mounted road wheel having rim structure defining a generally cylindrical interior surface and with the vehicle having a plurality of sleevelike inner nuts supporting the existing vehicle mounted wheel on the wheel hub structure of the vehicle, and further with the auxiliary wheel having a plurality of wheel mounting openings concentrically arranged about the axis of rotation of the auxiliary road wheel, the adaptor means comprising short elongated frame structure adapted for arrangement coaxially of the existing vehicle mounted road wheel, inboard external flange structure fixed concentrically on the inboard end of said adaptor frame structure having a plurality of circumferentially arranged openings adapted to receive respectively said plurality of inner nuts and with said inboard flange structure being adapted to be rigidly clamped against the wheel mounting section of the existing vehicle mounted road wheel, outboard external flange structure fixed concentrically on the outboard end of said adapted frame structure, threaded fastener means concentrically spaced about the axis of said adaptor frame structure adapted for threadedly clamping said auxiliary wheel concentrically on the outboard flange structure of said adaptor, and including support ring means concentrically fixed on the intermediate portion of said adaptor frame structure having a circumferential peripheral surface of a diameter substantially greater than the diameter of said annular inboard flange adapted to engage the cylindrical interior surface of the rim structure of the existing vehicle road wheel, the circumferential external surface proportions of said support ring corresponding generally with the circumferential internal surface proportions of said existing vehicle wheel rim, said supporting ring being adapted to be snugly received within said existing wheel rim when said adaptor is supporting said auxiliary wheel.

4. The adaptor means as defined in claim 3 wherein said plurality of threaded fastener means adapted for threadedly clamping said auxiliary wheel concentrically on the outboard flange structure of said adaptor includes a plurality of threaded studs concentrically arranged in said outboard flange and with each stud extending parallel the longitudinal center axis of said adaptor frame, said plurality of studs being adapted to be received respectively in said plurality of wheel mounting openings of said auxiliary wheel, and including a plurality of wheel nuts adapted for threaded engagement respectively on the plurality of studs and for threadedly clampingly securing said auxiliary wheel on the outboard flange structure of said adaptor.

5. In combination, a road vehicle including a rear wheel having a wheel mounting section having a plurality of circumferentially arranged apertures about the axis of rotation of said rear wheel, the vehicle including rear wheel mounting means including a wheel mounting hub and a plurality of concentrically arranged sleevelike inner nuts arranged about the axis of rotation of said mounting hub and extending each inner nut parallel with the axis of rotation of said wheel hub, an auxiliary wheel having a wheel mounting section having a plurality of apertures circumferentially arranged about the axis of rotation of said auxiliary wheel, and adaptor means fixedly mounting said auxiliary wheel coaxially with said vehicle rear wheel and at a disposition spaced closely adjacent the outboard side of said rear vehicle wheel, said adaptor means including annular inboard flange structure having structure defining a plurality of openings arranged circumferentially about the center axis of said annular inboard flange structure and with said inboard flange structure being arranged with the plurality of openings thereof receiving the plurality of inner nuts of said rear wheel mounting means, a plurality of outer nuts threadedly secured on said plurality of inner nuts clamping fixing said inboard flange on said rear wheel mounting section, an annular outboard flange, a plurality of threaded fastener means fixedly concentrically securing said outboard flange structure on the wheel mounting section of said auxiliary wheel with said plurality of threaded fastener means utilizing respectively the plurality of openings of said auxiliary wheel mounting section, a support ring having a circumferential peripheral surface of a diameter substantially greater than the diameter of said annular inboard flange, the support ring being concentrically positioned substantially within the vehicle rear wheel with the circumferential peripheral structure thereof being snugly engaged with the cylindrical rim of said vehicle rear wheel, and including frame structure rigidly interconnecting said inboard flange, said outboard flange and said support ring.

References Cited

UNITED STATES PATENTS

| | | | |
|---|---|---|---|
| 2,067,620 | 1/1937 | Johnston | 301—36 |
| 2,416,862 | 3/1947 | Baker | 301—36 |
| 2,807,507 | 9/1957 | Cook | 301—36 |
| 3,039,825 | 6/1962 | Clark | 301—36 |

RICHARD J. JOHNSON, Primary Examiner

U.S. Cl. X.R.

301—128